(12) United States Patent
Okuyama

(10) Patent No.: US 10,989,558 B2
(45) Date of Patent: Apr. 27, 2021

(54) ROUTE GUIDANCE METHOD AND ROUTE GUIDANCE DEVICE

(71) Applicants: Nissan Motor Co., Ltd., Yokohama (JP); Renault S.A.S., Boulogne-Billancourt (FR)

(72) Inventor: Takeshi Okuyama, Kanagawa (JP)

(73) Assignees: Nissan Motor Co., Ltd., Yokohama (JP); Renault S.A.S., Boulogne-Billancourt (FR)

(*) Notice: Subject to any disclaimer, the term of this patent is extended or adjusted under 35 U.S.C. 154(b) by 0 days.

(21) Appl. No.: 16/464,427

(22) PCT Filed: Nov. 30, 2016

(86) PCT No.: PCT/JP2016/085499
§ 371 (c)(1),
(2) Date: May 28, 2019

(87) PCT Pub. No.: WO2018/100658
PCT Pub. Date: Jun. 7, 2018

(65) Prior Publication Data
US 2020/0217684 A1 Jul. 9, 2020

(51) Int. Cl.
*G01C 21/34* (2006.01)
*B60W 60/00* (2020.01)
(Continued)

(52) U.S. Cl.
CPC ... *G01C 21/3658* (2013.01); *B60W 30/18163* (2013.01); *B60W 40/04* (2013.01);
(Continued)

(58) Field of Classification Search
CPC .......... G01C 21/3658; G01C 21/3492; G01C 21/34; B60W 30/18163; B60W 40/04;
(Continued)

(56) References Cited

U.S. PATENT DOCUMENTS

2012/0191344 A1* 7/2012 Iao .................. G01C 21/3658
701/436
2017/0082452 A1* 3/2017 Sumizawa ........... G08G 1/0141
(Continued)

FOREIGN PATENT DOCUMENTS

EP 2973494 A1 1/2016
JP 07141591 A * 6/1995
(Continued)

OTHER PUBLICATIONS

English Translation: Munakata, JP 2009133801 A, Jun. 2009, Japanese Patent Office Publication (Year: 2009).*
(Continued)

*Primary Examiner* — Nadeem Odeh
(74) *Attorney, Agent, or Firm* — Young Basile Hanlon & MacFarlane, P.C.

(57) ABSTRACT

A route guidance method includes: if, on a set route from a departure point to a destination of a vehicle, a travelling road at a present position of the vehicle has a first plurality of lanes, and a next road following a nearest branch point from the present position has a second plurality of lanes, finding a branch-merge point up to which lanes other than a lane for reaching the destination out of the second plurality of lanes have gone away; and if a start point of traffic congestion is downstream of the branch-merge point, and an end point of the traffic congestion is upstream of the nearest branch point, guiding the vehicle to the lane for reaching the destination as a target before reaching the end point.

7 Claims, 6 Drawing Sheets

(51) Int. Cl.
  *G01C 21/36* (2006.01)
  *B60W 30/18* (2012.01)
  *B60W 40/04* (2006.01)
  *G06K 9/00* (2006.01)
  *G05D 1/02* (2020.01)

(52) U.S. Cl.
  CPC ....... *B60W 60/001* (2020.02); *G01C 21/3492* (2013.01); *G05D 1/0212* (2013.01); *G06K 9/00798* (2013.01); *B60W 2552/53* (2020.02)

(58) Field of Classification Search
  CPC ............ B60W 2552/53; B60W 60/001; G06K 9/00798; G05D 1/0212
  USPC .................................................. 701/414, 533
  See application file for complete search history.

(56) References Cited

U.S. PATENT DOCUMENTS

2019/0156664 A1* 5/2019 Yamada ............... G08G 1/0133
2019/0383629 A1* 12/2019 Lee .................... G01C 21/3658

FOREIGN PATENT DOCUMENTS

| | | | |
|---|---|---|---|
| JP | H07141591 | A | 6/1995 |
| JP | 2009025235 | A | 2/2009 |
| JP | 2009031142 | A * | 2/2009 |
| JP | 2009133801 | A * | 6/2009 |
| JP | 2009133801 | A | 6/2009 |
| JP | 2013050397 | A * | 3/2013 |

OTHER PUBLICATIONS

English Translation: Watanabe, JP 2009031142 A, Feb. 2009, Japanese Patent Office Publication (Year: 2009).*
English Translation: Fukui, JP H07141591 A, Jun. 1995, Japanese Patent Office Publication (Year: 1995).*
English Translation: Yamaguchi, JP 2013050397 A, Mar. 2013, Japanese Patent Office Publication (Year: 2013).*
Definition: Merriam-Webster Dictionary, "Passing Lane", Mar. 16, 2016 , Merriam-Webster.com Online Dictionary <https://www.merriam-webster.com/dictionary/passing%20lane> (Year: 2016).*

* cited by examiner

ROUTE GUIDANCE METHOD AND ROUTE GUIDANCE DEVICE

TECHNICAL FIELD

The present invention relates to route guidance methods and route guidance devices for guiding a vehicle along a set route.

BACKGROUND

Japanese Patent Application Publication No. 2009-25235 discloses a navigation device that gives a lane change guidance in advance so that even when there is traffic congestion for right turn or left turn on a plurality of links continuing in the travelling direction of a host vehicle at the intersection at which the host vehicle is going to turn right or left, the host vehicle can reach the end of the traffic congestion.

Unfortunately, in the technique described in Japanese Patent Application Publication No. 2009-25235, if the road after a right or left turn has a plurality of lanes, and the traffic congestion continues, an interruption, which is a lane change during traffic congestion, may occur after the right or left turn, depending on the traveling direction after the right or left turn.

SUMMARY

In light of the above problem, an object of the present invention is to provide a route guidance method and a route guidance device having less possibility of occurrence of the interruption.

A route guidance method according to an aspect of the present invention includes: if, on a set route from a departure point to a destination of a vehicle, a travelling road at a present position of the vehicle has a first plurality of lanes, and a next road following a nearest branch point from the present position has a second plurality of lanes, finding a branch-merge point up to which lanes other than a lane for reaching the destination out of the second plurality of lanes have gone away; and if a start point of traffic congestion is downstream of the branch-merge point, and an end point of the traffic congestion is upstream of the nearest branch point, guiding the vehicle to the lane for reaching the destination as a target before reaching the end point, and if the start point is upstream of the branch-merge point, guiding the vehicle to a lane, other than passing lanes, of the second plurality of lanes as the target before reaching the end point.

The aspect of the present invention provides a route guidance method and a route guidance device having less possibility of occurrence of the interruption.

DETAILED DESCRIPTION

With reference to the drawings, an embodiment of the present invention will be described. In the illustration of the drawings, the same or similar parts are denoted by the same or similar reference signs, and description of those parts will be omitted.

[Route Guidance Device]

Figure 1:
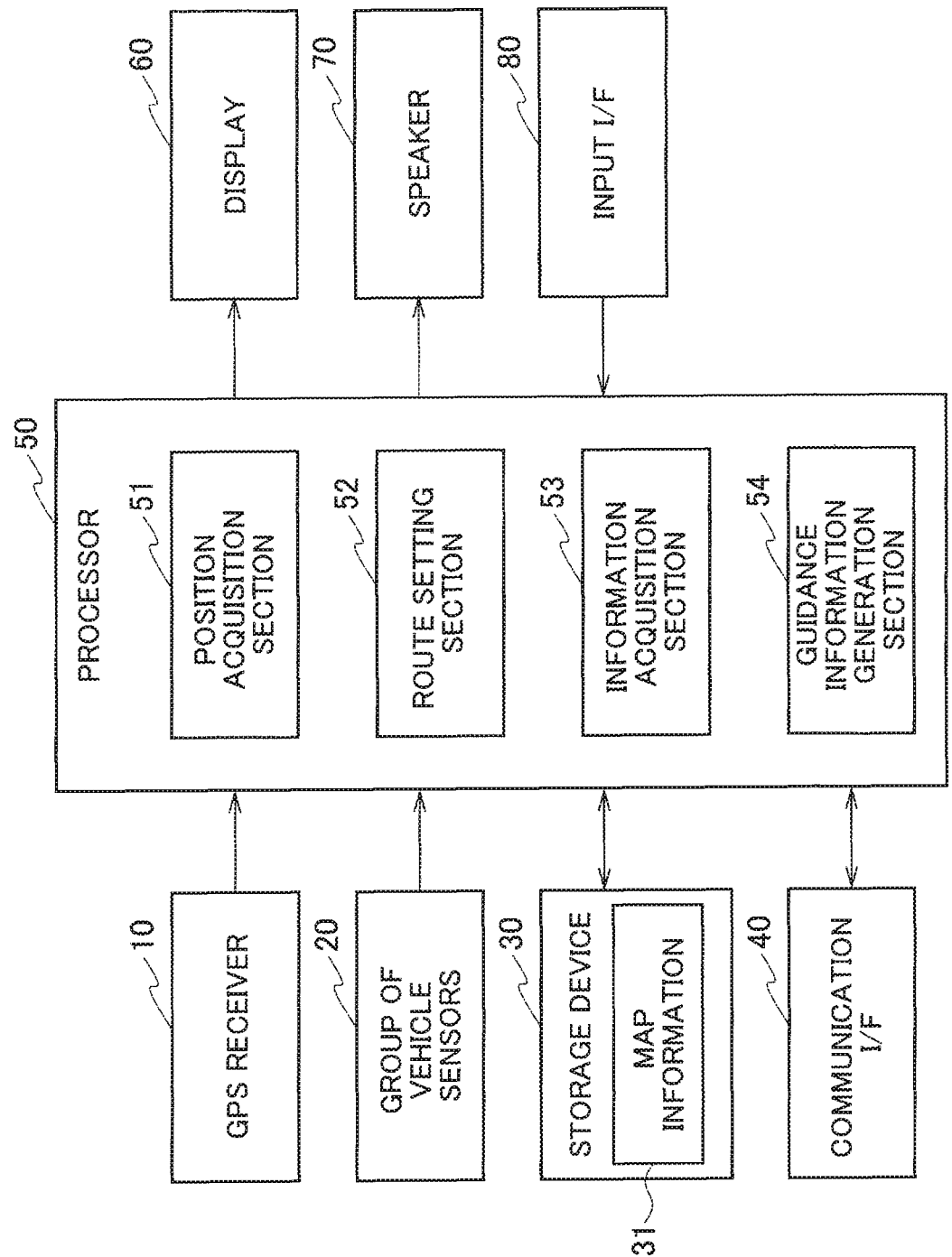
FIG. 1 is a schematic block diagram for explaining the basic structure of a route guidance device according to an embodiment of the present invention.

As illustrated in FIG. 1, a route guidance device according to this embodiment includes a GPS receiver 10, group of vehicle sensors 20, storage device 30, communication interface (I/F) 40, processor 50, display 60, speaker 70, and input I/F 80. The route guidance device according to this embodiment is mounted on a vehicle (a host vehicle) and guides the vehicle such that the vehicle travels along the set route set in advance.

The GPS receiver 10 is a positioning device for measuring the position of the host vehicle on the earth, using a positioning system such as the Global Positioning System (GPS). The GPS receiver 10 outputs measured positions to the processor 50 successively.

The group of vehicle sensors 20 acquires, by the sensors, the movement information of the host vehicle, such as the speed, the three-axis acceleration and angular velocity in the three-dimensional orthogonal coordinate system, and other information of the host vehicle and outputs the detection results to the processor 50 successively. The group of vehicle sensors 20 may include a speed sensor, acceleration sensor, angular velocity sensor, steering angle sensor, and the like. In addition, the group of vehicle sensors 20 detect information on the surroundings of the host vehicle. The group of vehicle sensors 20 may include an image sensor for capturing images of the surroundings of the host vehicle, a distance sensor, such as a laser range finder (LRF), for detecting the distance and direction from the host vehicle to a target, an azimuth sensor for detecting the azimuth of the host vehicle, and the like.

The storage device 30 stores map information 31 including information on the lanes of each road. The storage device 30 may include semiconductor memory, a magnetic disk, or the like which are computer readable storage media. The map information 31 includes not only general map information, such as roads, intersections, bridges, tunnels, and the like, but also information on road structures, such as the position, width, and traffic zone classification of each traffic lane, and information on the positions of planimetric features installed around roads, such as traffic signals. The map information 31 may be stored in the storage device 30 in advance or may be acquired from the outside via a network. In addition, the storage device 30 may store programs necessary for processing performed in the processor 50. The processor 50 may include one piece of hardware or may include multiple pieces of hardware.

The communication I/F 40 is, for example, a communication instrument for transmitting and receiving signals to and from the outside wirelessly. The communication I/F 40 is capable of receiving traffic congestion information at least on the set route, for example, using the Intelligent Transportation System (ITS) that transmits various kinds of information, such as traffic information and weather information, in real time. The ITS includes VICS (Vehicle Information and Communication System, registered trade mark), telematics, and the like. The communication I/F 40 outputs received information to the processor 50 successively.

The processor 50 is a processing circuit having a position acquisition section 51, route setting section 52, information acquisition section 53, and guidance information generation section 54 as the logical structure. The processor 50 may include, for example, a microcontroller which is an integrated circuit including a central processing unit (CPU), memory, input-output I/F, and the like. In this case, the sections included in the processor 50 are implemented by the CPU executing a computer program (route guidance program) installed in the microcontroller in advance. The sections included in the processor 50 may have one integrated piece of hardware or may have separate pieces of hardware. The microcontroller may serve also as, for example, an electronic control unit (ECU) used for other control related to the host vehicle, such as automated driving control.

The position acquisition section 51 acquires the present position of the host vehicle on the map information 31, based on the position measured by the GPS receiver 10 and the movement information on the host vehicle detected by the group of vehicle sensors 20. The position acquisition section 51 may also acquire a more precise present position of the host vehicle on the map information 31, such as the position of the host vehicle in the driving lane in the vehicle width direction, based on the relative positions of planimetric features around the host vehicle detected by the group of vehicle sensors 20 and the positions of planimetric features on the map information 31.

The route setting section 52 sets a destination on the map information 31 that the host vehicle is to reach, for example, in response to operation on the input I/F 80 by the user of the host vehicle. The route setting section 52 selects a travel route for the host vehicle from a departure point to a destination based on the map information 31 and sets it as a set route. The departure point is the present position of the host vehicle.

The information acquisition section 53 acquires traffic congestion information on roads around the host vehicle from the communication I/F 40. The information acquisition section 53 acquires traffic congestion information at least in a specified distance range ahead of the present position of the host vehicle on the set route set by the route setting section 52. The information acquisition section 53 also acquires information on the set route set by the route setting section 52 from information on the roads stored in the map information 31.

The guidance information generation section 54 generates guidance information for guiding the host vehicle such that the host vehicle travels along the set route set by the route setting section 52. The guidance information generation section 54 provides the guidance information to the controller that controls braking, acceleration, and steering of the host vehicle, to guide the host vehicle. Alternatively, the guidance information generation section 54 may guide the host vehicle by providing the guidance information to the user of the host vehicle via the display 60 or the speaker 70.

The display 60 presents various kinds of information to the user of the host vehicle by displaying images and letters under the control of the processor 50. The display 60 is, for example, a display device such as a liquid crystal display.

The display 60 displays the guidance information generated by the guidance information generation section 54 under the control of the processor 50. The display 60 displays a map around the present position of the host vehicle based on the map information 31.

The speaker 70 reproduces voice under the control of the processor 50 to present various kinds of information to the user of the host vehicle. The speaker 70 reproduces voice indicating the guidance information generated by the guidance information generation section 54 under the control of the processor 50.

The input I/F 80, for example, receives operation by the user of the host vehicle and outputs the signal according to the operation to the processor 50. The operation on the input I/F 80 may be performed by voice. The display 60 and the input I/F 80 may be integrated as a touch panel display.

[Route Guidance Method]

Figure 2:
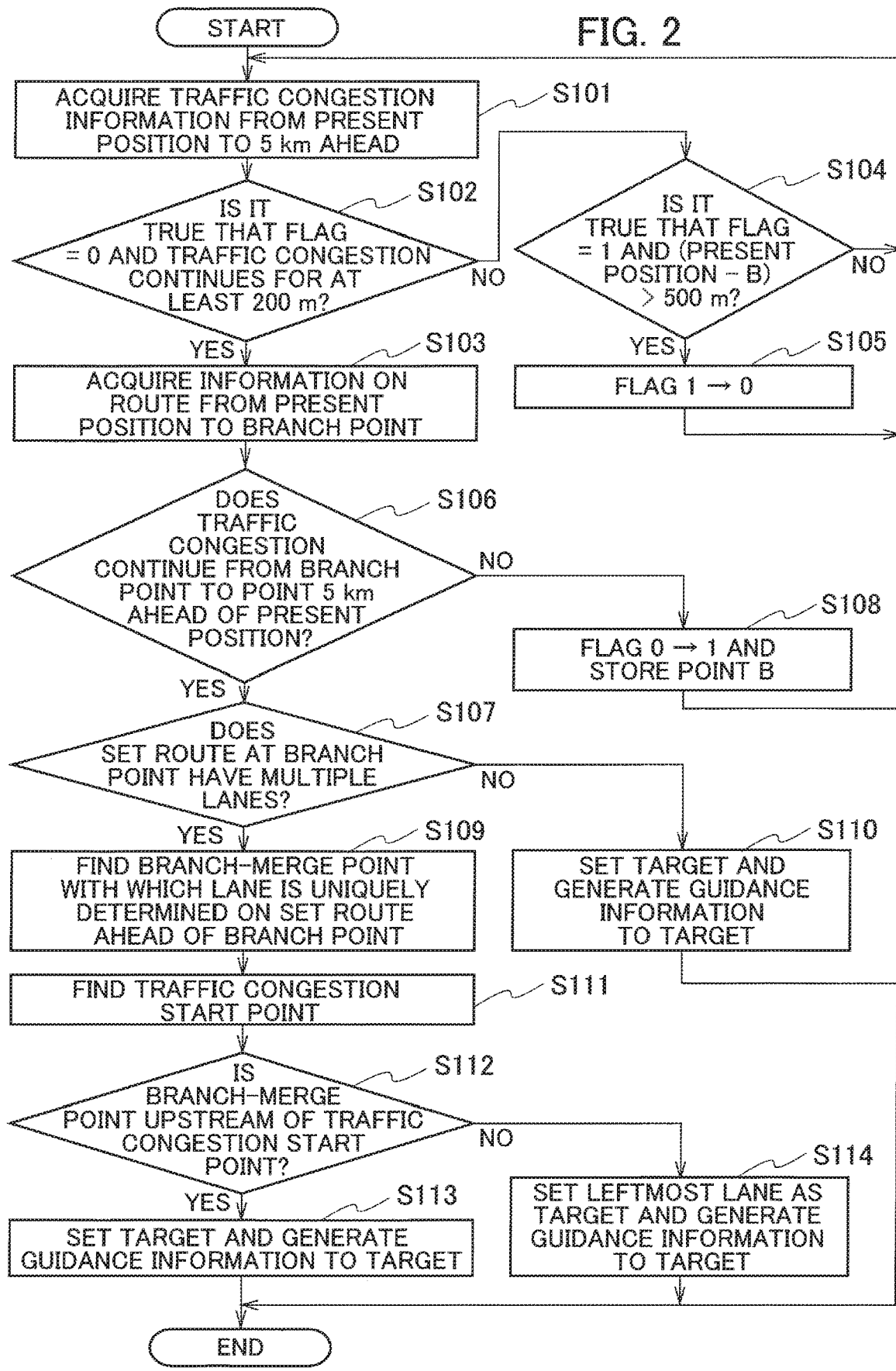
FIG. 2 is a flowchart for explaining an example of operation of the route guidance device according to the embodiment of the present invention.

With reference to the flowchart of FIG. 2, description will be provided for an example of operation of the route guidance device according to this embodiment. In the following, a scene in which the host vehicle travels on the set route set in advance will be described using FIG. 3 or 4 as necessary. The set route is lane R for reaching the destination, in other words, the road having lane R, connected to the destination.

Figure 3:
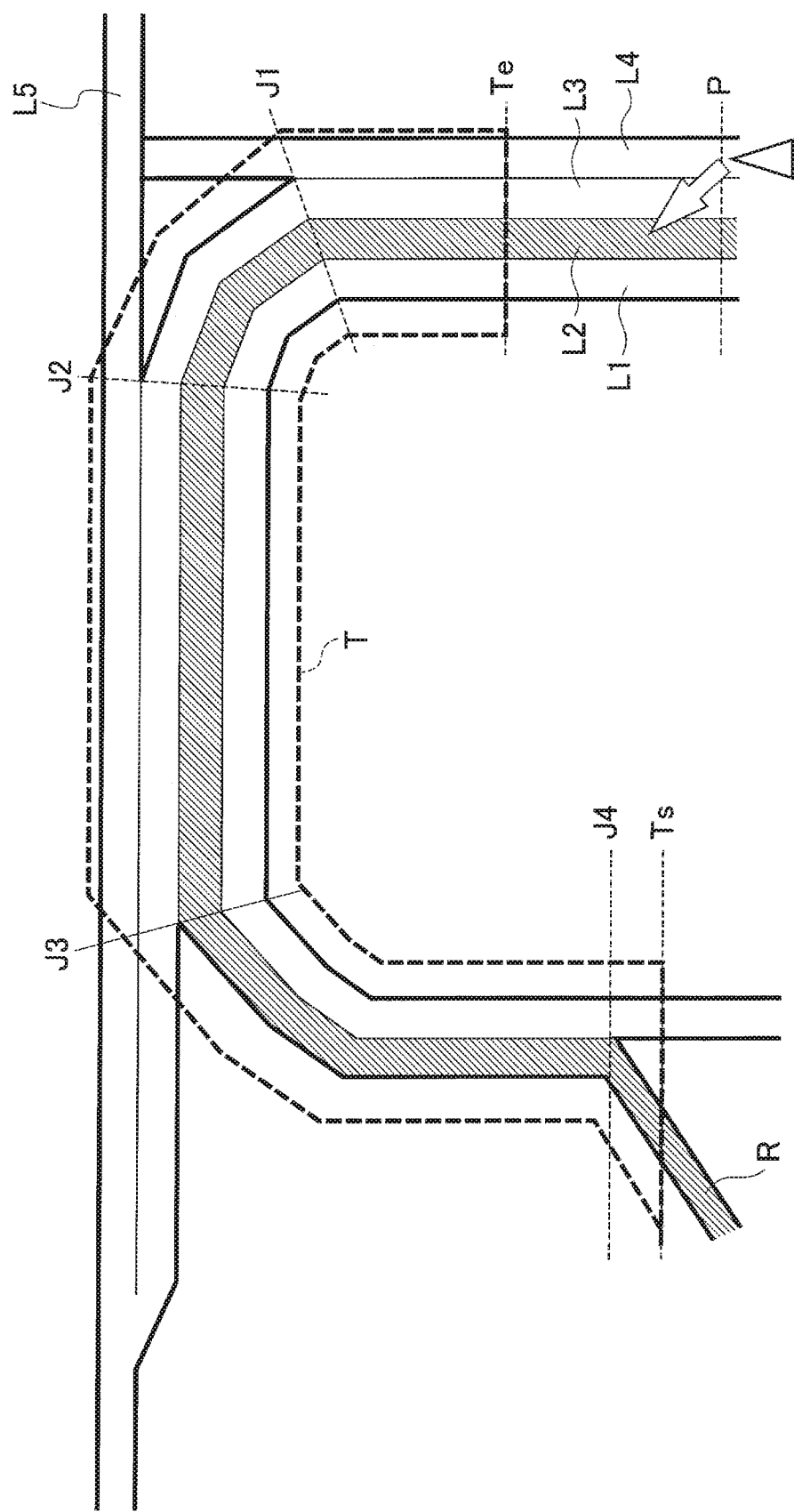
FIG. 3 shows an example illustrating the surroundings of a set route in the case where a traffic congestion start point is downstream of a branch-merge point on the set route.

At step S101, the information acquisition section 53 acquires traffic congestion information on the section from the present position P of the host vehicle acquired by the position acquisition section 51 to a point at a specified distance (for example, 5 km) on the set route set by the route setting section 52, via the communication I/F 40. Note that in this embodiment, description is provided assuming that the travelling road of present position P has multiple lanes L1 to L4 as illustrated in FIG. 3.

At step S102, the information acquisition section 53 determines whether the traffic congestion information acquired at step S101 includes traffic congestion section T having at least a specified distance (for example, 200 m), and the flag is 0. When judging that the flag is 0 and the traffic congestion information includes traffic congestion section T having at least the specified distance, the information acquisition section 53 advances the process to step 103, and when not judging that the flag is 0 and that the traffic congestion information includes traffic congestion section T having at least the specified distance, the information acquisition section 53 advances the process to step 104.

At step S103, the information acquisition section 53 acquires information on the road from the present position P of the host vehicle to the nearest branch point J1 on the set route from the map information 31 and the communication I/F 40, and advances the process to step 106. Specifically, the information acquisition section 53 acquires distance D1 from present position P to branch point J1, distance D2 from branch point J1 to end point Te of traffic congestion section T, and distance D3 from present position P to end point Te of traffic congestion section T, on the set route. In addition, the information acquisition section 53 acquires lane information indicating lanes L1 to L3 for entering the next road following branch point J1 (road from branch point J1 to merge point J2) on the set route.

At step S104, the information acquisition section 53 determines whether the flag is 1 and the host vehicle travels from point B by at least a specified distance (for example, 500 m). The distance by which the host vehicle has traveled can be obtained by subtracting point B described later from present position P on the set route. When judging that the flag is 1 and the host vehicle has traveled by farther than the specified distance, the information acquisition section 53 advances the process to step 105, and when not judging that the flag is 1 and the host vehicle has traveled by farther than the specified distance, the information acquisition section 53 returns the process to step S101.

At step S105, the information acquisition section 53 sets the flag from 1 to 0 and returns the process to step S101.

At step S106, the information acquisition section 53 determines whether traffic congestion section T continues from branch point J1 to the point at a specified distance (for example, 5 km) from present position P on the set route. If traffic congestion section T continues, the information acquisition section 53 advances the process to step 107, and if not, the information acquisition section 53 advances the process to step 108.

At step S108, the information acquisition section 53 sets the flag from 0 to 1 and stores point B as present position P of the host vehicle. As described above, the information acquisition section 53 sets the flag based on the distance by which the host vehicle has traveled and the length of traffic congestion section T. This makes it possible to increase the intervals between timings of acquiring specific information, reducing the processing load of the processor 50 and the communication amount of the communication I/F 40.

At step S107, the information acquisition section 53 determines whether the next road following branch point J1 on the set route has multiple lanes. If the next road has multiple lanes, the information acquisition section 53 advances the process to step 109, if not, in other words, if the next road has one lane, the information acquisition section 53 advances the process to step 110.

At step S110, the guidance information generation section 54 sets the section from present position P to end point Te on the lane for entering the next road following to branch point J1 as a target and generate guidance information to the target. The guidance information includes the distance from present position P to end point Te, the direction of the target (right-left direction), and the number of lanes that the host vehicle needs to change from driving lane L4 by the time the host vehicle reaches the target. The guidance information generation section 54 provides the guidance information to the controller of the host vehicle or the user of the host vehicle to guide the host vehicle.

At step S109, the information acquisition section 53 finds branch-merge point J4, at which a lane is uniquely determined, from multiple lanes L1 to L3 of the next road following branch point J1 on the set route ahead of branch point J1. In other words, the information acquisition section 53 finds branch-merge point J4, at which lanes L1 and L3 other than lane R (lane L2) for reaching the destination have gone away, out of multiple lanes L1 to L3 on the next road following branch point J1 on the set route. The information acquisition section 53 advances the process to step 111 after finding branch-merge point J4. Note that the branch-merge point is a point at which the number of lanes decreases because of branching, merging, or the like, and the branch-merge point includes the branch point where a road branches off and the merge point where roads merge.

At step S111, the information acquisition section 53 finds start point Ts of traffic congestion section T on the set route, based on the traffic congestion information acquired via the map information 31 and the communication I/F 40.

At step S112, the information acquisition section 53 determines whether branch-merge point J4 found at step S109 is upstream of start point Ts found at step S111 on the set route. If branch-merge point J4 is upstream of start point Ts, the information acquisition section 53 advances the process to step 113, and if branch-merge point J4 is downstream of start point Ts, the information acquisition section 53 advances the process to step 114.

At step S113, start point Ts of traffic congestion section T is downstream of branch-merge point J4 as illustrated in FIG. 3, and end point Te is upstream of branch point J1. In this case, the guidance information generation section 54 sets the section from present position P to end point Te on lane R for reaching the destination as a target, and generates the guidance information to the target. The guidance information includes the distance from present position P to end point Te, the direction of the target (right-left direction), and the number of lanes from the driving lane L4 to the target. The guidance information generation section 54 provides the guidance information to the controller of the host vehicle or the user of the host vehicle to guide the host vehicle.

Figure 4:
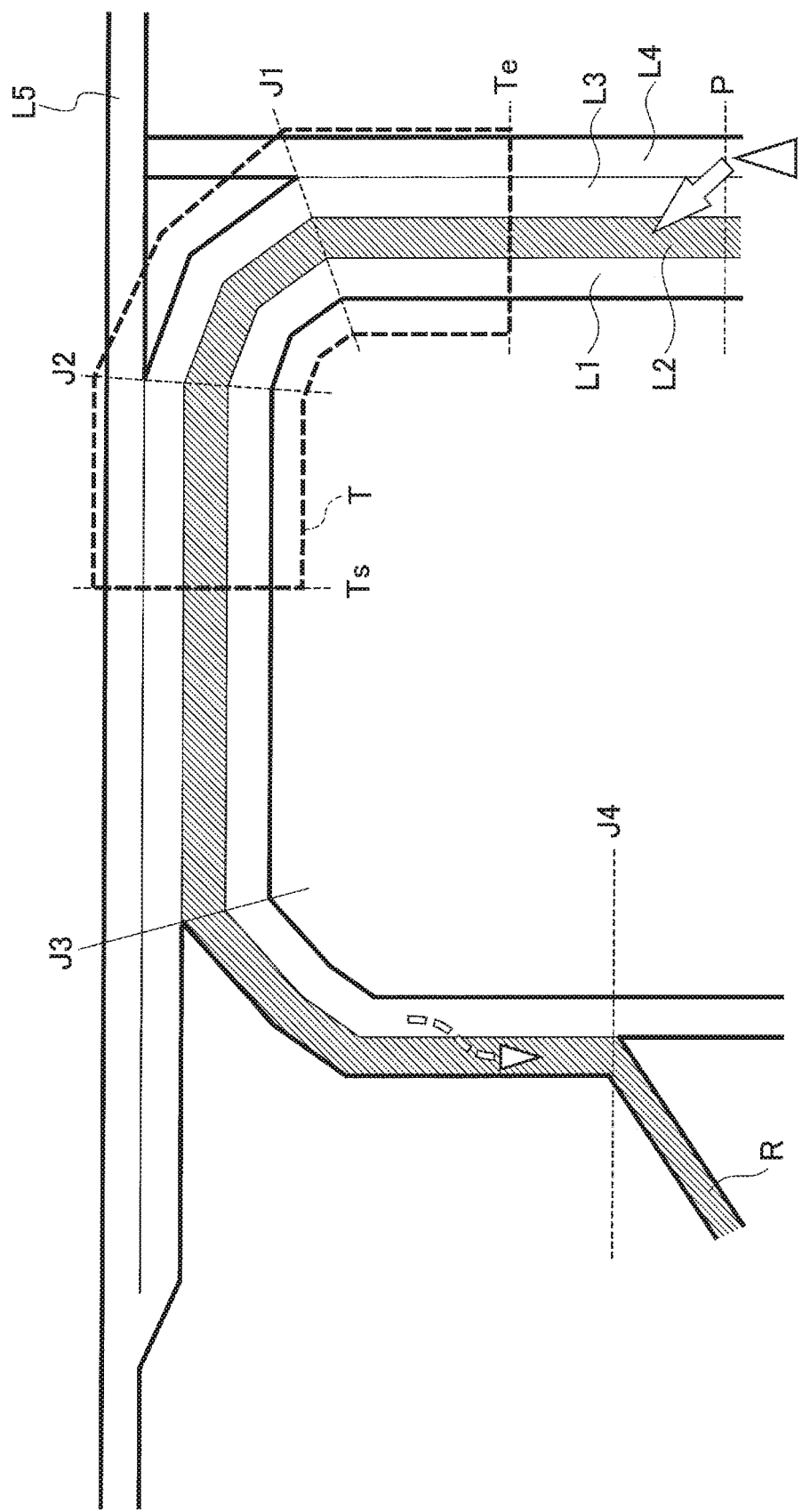
FIG. 4 shows an example illustrating the surroundings of a set route in the case where a traffic congestion start point is upstream of a branch-merge point on the set route.

At step S114, start point Ts of traffic congestion section T is upstream of branch-merge point J4 as illustrated in FIG. 4, and end point Te is upstream of branch point J1. In this case, the guidance information generation section 54 sets the section from present position P to end point Te on the leftmost lane L1 of lanes L1 to L3 as the target, and generates the guidance information to the target. The guidance information includes the distance from present position P to end point Te, the direction of the target (right-left direction), and the number of lanes from the driving lane L4 to the target. The guidance information generation section 54 provides the guidance information to the controller of the host vehicle or the user of the host vehicle to guide the host vehicle.

For example, in the example illustrated in FIG. 3, if the host vehicle changes the lane to the leftmost lane L1 before end point Te and travels in traffic congestion section T, the host vehicle needs to change the lane to lane R (lane L2) for reaching the destination before reaching branch-merge point J4. Alternatively, if the host vehicle changes the lane to lane L3 before end point Te, the host vehicle needs to change the lane to lane R for reaching the destination before reaching branch point J3. In these cases, interruptions, which are lane changes in traffic congestion section T, occur.

The route guidance device according to this embodiment guides the host vehicle to lane R leading to the destination before reaching end point Te if start point Ts of the traffic congestion is downstream of branch-merge point J4, and end point Te is upstream of branch point J1. This reduces the possibility of occurrence of interruptions which are lane changes in traffic congestion section T.

The route guidance device according to this embodiment guides the host vehicle to the leftmost lane L1, which continues to the next road following branch point J1, before reaching end point Te, if start point Ts of the traffic congestion is upstream of branch-merge point J4. As illustrated in FIG. 4, the host vehicle can reach lane R without an interruption after passing through traffic congestion section T before reaching branch-merge point J4. This reduces the number of chances in which the host vehicle continues to travel in lanes L2 to L5, which are passing lanes, in sections without traffic congestion. Note that although in this embodiment, the host vehicle is guided to the leftmost lane L1, the lane to which the host vehicle is guided may be changed depending on the road structure. Although in this embodiment, description has been provided for the case where the set route is on the left side of branch point J1 and the set route has multiple lanes L1 to L3, it is conceivable that the set route is on the right side of branch point J1, as in the case of, for example, a ring road, and the set route on the right side of branch point J1 has multiple lanes. In such a case, the host vehicle is guided to the rightmost lane which continues to the next road following branch point J1. This makes it possible to guide according to the road structure.

The route guidance device according to this embodiment provides the user of the host vehicle with the distance from present position P to end point Te, the direction of the target with respect to the host vehicle, and the number of lanes from the driving lane of the host vehicle to the target, to guide the host vehicle. The user of the host vehicle can know the timing by when the lane change to the target needs to be completed, and this increases the possibility that the host vehicle can change lanes without difficulty before the host vehicle reaches end point Te.

OTHER EMBODIMENTS

As described above, the present invention has been described using the above embodiment. However, it should not be understood that the description and the drawings constituting part of this disclosure limit the present invention. From this disclosure, various alternative embodiments, examples, and operational techniques will be apparent to those skilled in the art.

For example, in the embodiment already described, branch point J1 nearest to the present position P of the host vehicle may be a branch-merge point at which the number of lanes decreases by merging or the like. In addition, branch-merge point J4 on the set route at which lanes L1 and L3 other than lane R for reaching the destination have gone away, out of lanes L1 to L3 in the next road following branch point J1 nearest to present position P of the host vehicle, is not necessarily a branch point. In addition, in the case where the next road following to branch point J1 has multiple lanes, the number of these lanes and the number of lanes at present position P may be the same or may be different.

Figure 5:
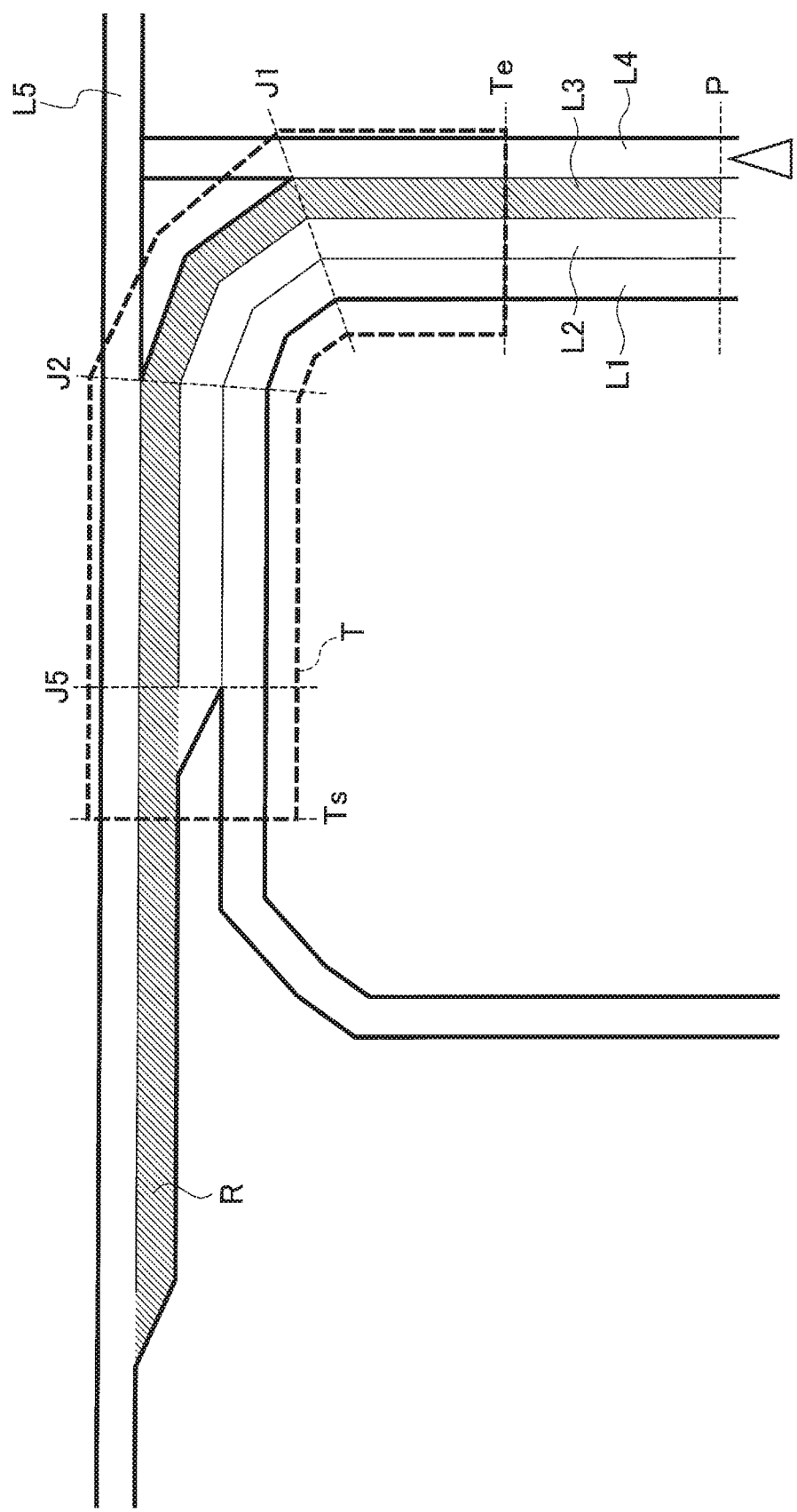
FIG. 5 shows an example illustrating the surroundings of a set route in the case where a traffic congestion start point is downstream of a point, at which the number of lanes decreases, on the set route.

For example, assume a scene as illustrated in FIG. 5 in which on the set route, the next road following branch point J1, having multiple lanes L1 to L3, merges with a road having a single lane L5 at the next merge point J2, and then at point J5, lane L2 merges into lane L3, decreasing the number of lanes. In this case, start point Ts of traffic congestion section T is downstream of point J5 at which the number of lanes decreases, and end point Te is upstream of branch point J1. In this case, the guidance information generation section 54 guides the host vehicle to lane R (lane L3) for reaching the destination as the target before reaching end point Te. This reduces the possibility of occurrence of interruptions which are lane changes in traffic congestion section T.

Figure 6:
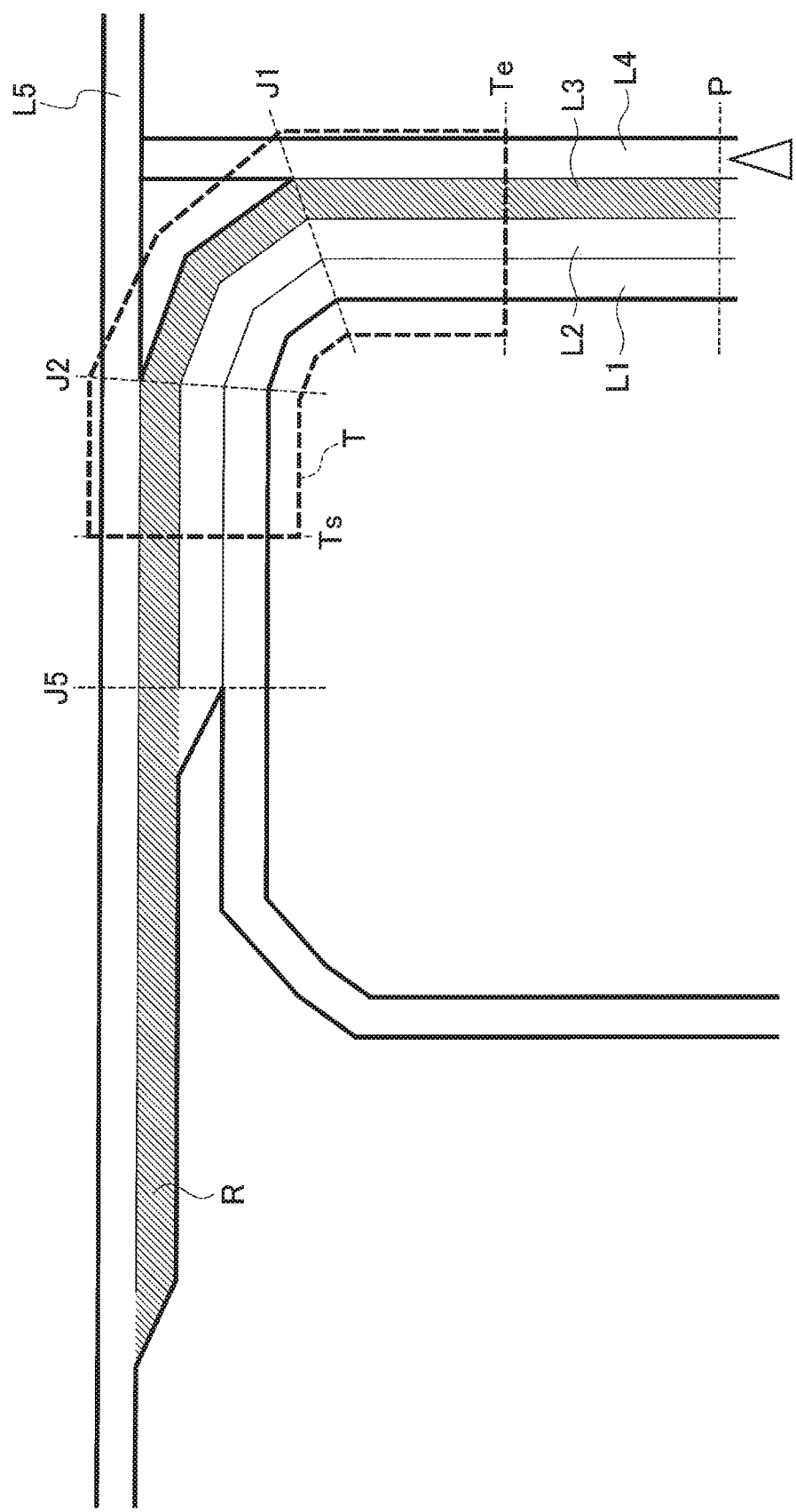
FIG. 6 shows an example illustrating the surroundings of a set route in the case where a traffic congestion start point is upstream of a point, at which the number of lanes decreases, on the set route.

In addition, if start point Ts of traffic congestion section T is upstream of point J5 at which the number of lanes decreases, and end point Te is upstream of branch point J1 as illustrated in FIG. 6, the guidance information generation section 54 guides the host vehicle to the leftmost lane L1 of the next road following branch point J1 as the target before reaching end point Te. This reduces the number of chances in which the host vehicle continues to travel in lanes L2 to L5, which are passing lanes, in sections without traffic congestion.

In addition, in the embodiment already described, multiple lanes L1 to L3, which the next road following branch point J1 on the set route has, may be lanes, out of lanes L1 to L3, to which the host vehicle can change the lane from the current driving lane L4 before the host vehicle reaches branch point J1. In other words, the information acquisition section 53 may calculate lanes to which the host vehicle can change the lane from the current driving lane L4 before the host vehicle reaches branch point J1 as the lanes of the next road following branch point J1, based on distances D1 to D3 acquired at step S103.

In addition, in the embodiment already described, the vehicle on which the route guidance device is mounted may be an automated driving vehicle which travels automatically by detecting information on the surroundings of a set route or may also be a vehicle that travels in response to the user's operation. In the case where the route guidance device is mounted on an automated driving vehicle, the guidance information generation section 54 provides the guidance information to the controller for controlling driving of the vehicle, and the controller controls braking, acceleration, steering, and other operation in response to the guidance information.

The functions described in the above embodiment can be implemented by one or more processing circuits. The processing circuit includes a programmed processing device, such as a processing device including electrical circuitry. The processing circuit may also include devices such as an application specific integrated circuit (ASIC), adapted to perform specified functions, and circuit parts.

As a matter of course, the present invention includes, besides the above, various embodiments and the like not described herein, such as configurations to which the above configurations are mutually applied. Thus, the technical scope of the present invention is determined only by the matters specifying the invention according to the claims, relevant to the above description.

REFERENCE SIGNS LIST 30 storage device
31 map information
50 processor
J1 branch point
J4 branch-merge point
L1 to L5, R lane
T traffic congestion section
Te end point
Ts start point

The invention claimed is:
1. A route guidance method of guiding a vehicle such that the vehicle travels along a set route from a departure point to a destination of the vehicle, the set route being set based on map information, the method performed with a processor and comprising:
on the set route, when a travelling road at a present position of the vehicle has a first plurality of lanes, a next road following a nearest branch point from the present position has a second plurality of lanes that includes at least a subset of the first plurality of lanes, an end point of a traffic congestion is upstream of the nearest branch point, the traffic congestion is in all lanes of the first plurality of lanes and the second plurality of lanes, and the set route takes the vehicle past the nearest branch point,
finding a branch-merge point, after the nearest branch point on the set route, at which a lane for reaching the destination out of the second plurality of lanes is an only lane that remains on the set route at the branch-merge point;
determining whether a start point of the traffic congestion is downstream of the branch-merge point, wherein the start point is a first position of a leading vehicle in the traffic congestion and the end point is a second position of a last vehicle in the traffic congestion;

determining a route including a target lane to guide the vehicle to before the vehicle reaches the end point of the traffic congestion,
wherein the target lane is determined based on whether the start point of the traffic congestion is downstream of the branch-merge point, and
wherein the target lane is one of
a non-passing lane of the second plurality of lanes, or
the lane of the second plurality of lanes for reaching the destination; and
providing the route to a controller of the vehicle, wherein the vehicle is autonomously controlled along the route by the controller.

2. The route guidance method according to claim 1, wherein
the guiding the vehicle includes providing the controller of the vehicle with a distance from the present position to the end point and a direction of the target lane with respect to the vehicle.

3. The route guidance method according to claim 1, wherein determining the route including the target lane to guide the vehicle to before the vehicle reaches the end point comprises:
in response to determining that the start point of the traffic congestion is downstream of the branch-merge point, setting the target lane to the lane of the second plurality of lanes for reaching the destination.

4. The route guidance method according to claim 1, wherein determining the route including the target lane to guide the vehicle to before the vehicle reaches the end point comprises:
in response to determining that the start point of the traffic congestion is upstream of the branch-merge point, setting the target lane to the non-passing lane of the second plurality of lanes.

5. A route guidance device comprising:
a semiconductor memory or a magnetic disk that stores map information; and
a processor that determines a set route for a vehicle such that the vehicle travels along the set route from a departure point to a destination of the vehicle, the set route being set based on the map information, wherein:
when, on the set route, a travelling road at a present position of the vehicle has a first plurality of lanes, a next road following a nearest branch point from the present position has a second plurality of lanes that includes at least a subset of the first plurality of lanes, an end point of a traffic congestion is upstream of the nearest branch point, the traffic congestion is in all lanes of the first plurality of lanes and the second plurality of lanes, and the set route takes the vehicle past the nearest branch point,
the processor finds a branch-merge point, after the nearest branch point on the set route, at which a lane for reaching the destination out of the second plurality of lanes is an only lane that remains on the set route at the branch-merge point, the branch-merge point being a point at which a number of lanes decreases,
when a start point of the traffic congestion is downstream of the branch-merge point,
the processor determines a first set route that guides the vehicle to reach a first target lane of the second plurality of lanes before the vehicle reaches the end point of the traffic congestion, wherein the start point of the traffic congestion is a first position of a leading vehicle in the traffic congestion and the end point is a second position of a last vehicle in the traffic congestion,
when the start point of the traffic congestion is upstream of the branch-merge point,
the processor determines a second set route that guides the vehicle to a second target lane, other than highway passing lanes, of the second plurality of lanes before reaching the end point of the traffic congestion, and
the processor provides the first set route or the second set route to a controller of the vehicle, wherein the vehicle is autonomously controlled along the first set route or the second set route by the controller.

6. A route guidance method of guiding a vehicle such that the vehicle travels along a set route from a departure point to a destination of the vehicle, the set route being set based on map information, the method performed with a processor and comprising:
on the set route, when a travelling road at a present position of the vehicle has a first plurality of lanes, a next road following a nearest branch point from the present position has a second plurality of lanes that includes at least a subset of the first plurality of lanes, an end point of a traffic congestion is upstream of the nearest branch point, the traffic congestion is in all lanes of the first plurality of lanes and the second plurality of lanes, and the set route takes the vehicle past the nearest branch point,
finding a branch-merge point at which a lane for reaching the destination out of the second plurality of lanes is an only lane that remains on the set route at the branch-merge point, the branch-merge point being a point at which a number of lanes decreases;
when the processor determines that a start point of the traffic congestion is upstream of the branch-merge point,
determining a route that guides the vehicle to a target lane, other than highway passing lanes, of the second plurality of lanes as the target before reaching the end point, wherein the start point is a position of a leading vehicle in the traffic congestion and the end point is a position of a last vehicle in the traffic congestion; and
providing the route to a controller of the vehicle, wherein the vehicle is autonomously controlled along the route by the controller.

7. The route guidance method of guiding according to claim 6, further comprising:
when the processor determines that the start point of the traffic congestion is downstream of the branch-merge point, determining the route that guides the vehicle to reach a first target lane of the second plurality of lanes before the vehicle reaches the end point of the traffic congestion.

* * * * *